United States Patent [19]
Beeteson et al.

[11] Patent Number: 5,877,597
[45] Date of Patent: Mar. 2, 1999

[54] DISPLAY DEVICE

[75] Inventors: John Beeteson, Skelmorlie; Andrew Knox, Kilbirnie, both of United Kingdom

[73] Assignee: International Business Machines Corporation, Armonk, N.Y.

[21] Appl. No.: 778,320

[22] Filed: Jan. 2, 1997

[30] Foreign Application Priority Data

Jun. 13, 1996 [GB] United Kingdom ................... 9612345

[51] Int. Cl.$^6$ .............................. H01J 29/70; H01J 29/72
[52] U.S. Cl. ........................................... 315/366; 313/422
[58] Field of Search .............................. 315/366; 313/422

[56] References Cited

U.S. PATENT DOCUMENTS 4,835,438  5/1989  Baptist et al. .
4,928,041  5/1990  Mayer et al. .

FOREIGN PATENT DOCUMENTS 0 018 688  11/1980  European Pat. Off. .

*Primary Examiner*—Theodore M. Blum
*Attorney, Agent, or Firm*—Daniel E. McConnell

[57] ABSTRACT

A display device comprises a cathode and a permanent magnet. A two dimensional array of rows and columns of channels extends between opposite poles of the magnet for receiving electrons from the cathode. A screen has a plurality of phosphor pixels each corresponding to a different channel and each comprising a plurality of sub-pixels facing the side of the magnet remote from the cathode. Grid electrode means is disposed between the cathode means and the magnet. A plurality of pairs of anodes are disposed between the magnet and the screen and extending parallel to the columns of channels. Each pair corresponds to a different column of channels and each pair has first and second anodes extending along opposite sides of the corresponding column of channels. Address means supplies control signals to the grid electrode means to selectively control flow of electrons from the cathode through each channel to the corresponding pixel. An anode drive circuit supplies anode drive signals to the first and second anodes respectively. The anode drive circuit comprises bias means for generating an acceleration component of each anode drive signal for accelerating electrons through the channels, deflection means for generating a deflection component of each anode drive signal for deflecting electrons emerging from each channel towards different sub-pixels of the corresponding pixel, and correction means for varying the deflection component to align the deflected electron beams with the corresponding sub-pixels.

10 Claims, 5 Drawing Sheets

DISPLAY DEVICE

BACKGROUND OF THE INVENTION

1. Field of the Invention

The present invention relates to a magnetic matrix display device.

2. Background Description

Magnetic matrix display devices may be employed in a range of different information displays, including television receivers and visual display units for computers.

SUMMARY OF THE INVENTION

In accordance with the present invention there is now provided a display device comprising: a cathode; a permanent magnet; a two dimensional array of rows and columns of channels extending between opposite poles of the magnet for receiving electrons from the cathode; a screen having a plurality of phosphor pixels each corresponding to a different channel and each comprising a plurality of sub-pixels facing the side of the magnet remote from the cathode; grid electrode means disposed between the cathode means and the magnet; a plurality of pairs of anodes disposed between the magnet and the screen and extending parallel to the columns of channels, each pair corresponding to a different column of channels, and each pair having first and second anodes extending along opposite sides of the corresponding column of channels; address means for supplying control signals to the grid electrode means to selectively control flow of electrons from the cathode through each channel to the corresponding pixel; and an anode drive circuit for supplying anode drive signals to the first and second anodes respectively; the anode drive circuit comprising bias means for generating an acceleration component of each anode drive signal for accelerating electrons through the channels, deflection means for generating a deflection component of each anode drive signal for deflecting electrons emerging from each channel towards different sub-pixels of the corresponding pixel, and correction means for varying the deflection component to align the deflected electron beams with the corresponding sub-pixels.

Preferably, the correction means comprises an offset generator for generating an offset between the deflection component of the anode drive signal supplied to the first anode and the deflection component of the anode drive signal supplied to the second anode.

In a preferred embodiment of the present invention, the screen has a cylindrical section in a direction orthogonal to the columns of channels and the offset generated by the offset generator has a parabolic waveform.

The correction means may comprise a modulator for amplitude modulating the deflection components generated by the deflection means with a parabolic waveform.

Viewing the present invention from another aspect, there is now provided a display device comprising: a cathode; a permanent magnet; a two dimensional array of rows and columns of channels extending between opposite poles of the magnet for receiving electrons from the cathode; a screen having a plurality of phosphor pixels each corresponding to a different channel and each facing the side of the magnet remote from the cathode; grid electrode means disposed between the cathode means and the magnet; anode means disposed between the screen and the magnet; a focus electrode means disposed between the screen and the anode means; address means for supplying control signals to the grid electrode means to selectively control flow of electrons from the cathode through each channel to the corresponding pixel; an anode drive circuit for supplying anode drive signals to the anode means for accelerating electrons through the channels; and, a focus drive circuit for supplying a focus drive signal to the focus electrode means to focus the electrons emerging from the channels onto the screen.

In a preferred embodiment of the present invention, the screen has a cylindrical section in a direction orthogonal to the columns of channels and the focus drive signal supplied to the focus electrode means comprises a parabolic waveform.

In a particularly preferred embodiment of the present invention, there is provided beam rotation means for varying the focus drive signal supplied to the focus electrode means to rotate beams of electrons travelling from the anode means to the screen.

In an especially preferred embodiment of the present invention, each pixel comprises a plurality of sub-pixels; the anode means comprises a plurality of pairs of anodes disposed between the magnet and the screen and extending parallel to the columns of channels, each pair corresponding to a different column of channels, and each pair having first and second anodes extending along opposite sides of the corresponding column of channels; and the anode drive means comprises deflection means for supplying deflection signals to the first and second anodes to sequentially deflect electrons emerging from each channel towards different sub-pixels of the corresponding pixel.

The focus electrode means preferably comprises a plane electrical conductor having slots formed therein, each slot being aligned with a different column of channels.

Preferably, the grid electrode means comprises a plurality of parallel row conductors and a plurality of parallel column conductors arranged orthogonally to the row conductors, each channel being located at a different intersection of a row conductor and a column conductor.

BRIEF DESCRIPTION OF THE DRAWINGS

Preferred embodiments of the present invention will now be described by way of example only with reference to the accompanying drawings in which.

DETAILED DESCRIPTION OF PREFERRED EMBODIMENTS OF THE INVENTION

Figure 1:
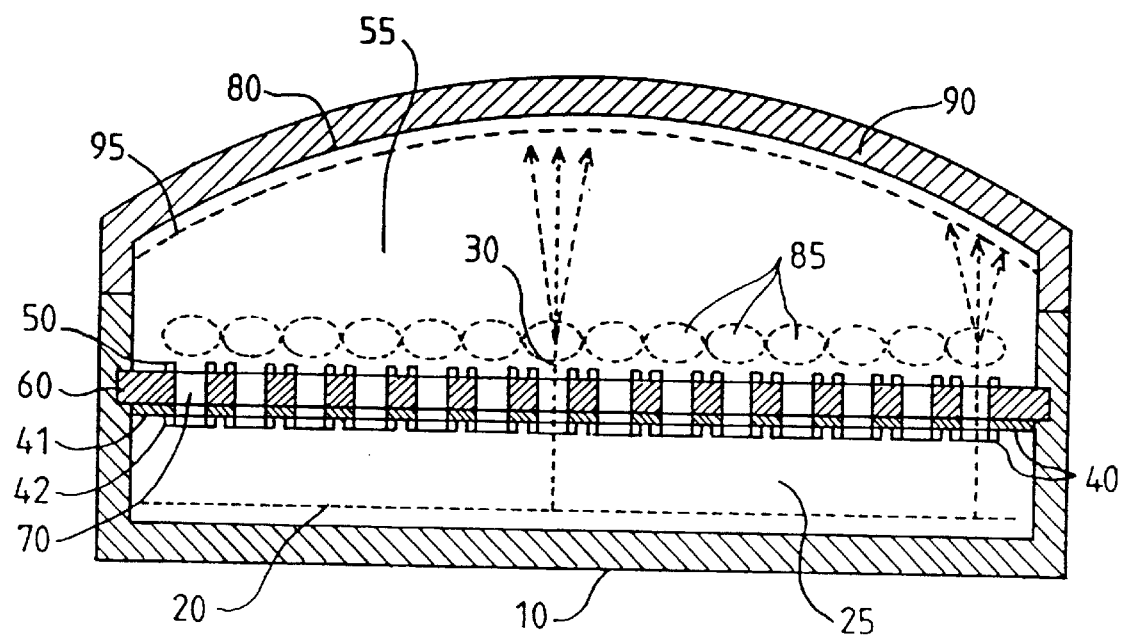
FIG. 1 is a cross-sectional view of an example of a display device embodying the present invention.

Referring now to FIG. 1, an example of a magnetic matrix display device comprises a first glass plate 10 and a second glass plate 90. An area cathode 20 is disposed between plates 10 and 90. A layer of sequentially arranged red, green and blue phosphor stripes 80 is disposed on plate 90 facing cathode 20. The phosphors are preferably high voltage phosphors. A final anode layer 95 is disposed on phosphors 80. A permanent magnet 60 is disposed between cathode 20 and phosphors 80. Magnet 60 is perforated by a two dimension matrix of apertures or "pixel wells" 70. An array of anodes 50 are formed on the surface of the magnet 60 facing the phosphors 80. For the purposes of explanation of the operation of the display, this surface will be referred to as the top of the magnet 60 and the region between phosphors 80 and anodes 50 will be referred to as the anode region 55. There is a pair of anodes 50 associated with each column of the matrix of pixel wells 70. The anode of each pair extend along opposite sides of the corresponding column of pixel wells 70. A control grid 40 is formed on the surface of the magnet 60 facing the cathode 20. For the purposes of explanation of the operation of the display, this surface will be referred to as the bottom of the magnet 60. The control grid 40 comprises a first group of parallel control grid conductors extending across the magnet surface in a column direction and a second group of parallel control grid conductors extending across the magnet surface in a row direction so that each pixel well 70 is situated at the intersection of different combination of a row grid conductor 41 and a column grid conductor 42. During manufacture, plates 10 and 90, and magnet 60 are brought together, sealed and then the whole is evacuated.

Figure 2:
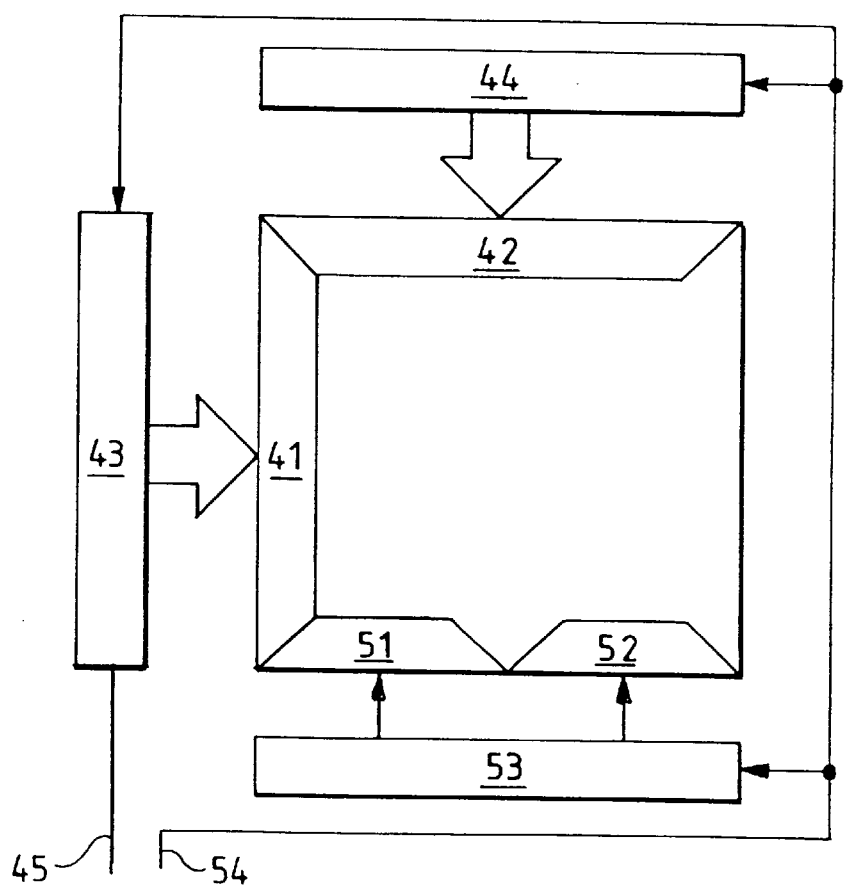
FIG. 2 is a block diagram of the display device.

Referring now to FIG. 2, deflection circuitry 53 is connected to anodes 51 and 52; column drive circuitry 44 is connected to column conductors 42; and, row drive circuitry 43 is connected to row conductors 41. Input video data 45 is connected to row drive circuitry 43. Input video clock data 54 is connected to row drive circuitry 43, column drive circuitry 44, and deflection circuitry 53.

In operation, electrons are released from cathode 20 and attracted towards control grid 40. Control grid 40 provides a row/column matrix addressing mechanism for selectively admitting electrons to each pixel well 70. Electrons pass through grid 40 into an addressed pixel well 70. In each pixel well 70, there is an intense magnetic field. The intense magnetic field causes electrons to travel through each well 70 along a helical path. Electrons entering each well 70 are collimated by the magnetic field to form a dense electron beam 30. The pair of anodes 50 at the top of pixel well 70 accelerate the electrons through pixel well 70 and provide selective sideways deflection of the emerging electron beam 30. Electron beam 30 is then accelerated towards higher voltage (typically 10 kV) final anode 95 on plate 90 to produce a high velocity electron beam 30 having sufficient energy to penetrate the anode and reach the underlying phosphors 80 resulting in light output. Each column of pixel wells 70 corresponds to a different set of red, green and blue phosphor stripes.

Video input data 45 is applied to row conductors 41 via row drive circuitry 43. Column drive circuitry 44 sequentially enables successive columns of pixels. For each column of pixels enabled, row drive circuitry 43 simultaneously applies video data to each of row conductors 41. The next column of pixels is then enabled by column drive circuitry 44. Row drive circuitry 43 now applies the video data corresponding to the next column of pixels to row conductors 41. This scan process continues until the last column of pixels is reaches. Clock signal 54 synchronises row drive circuitry 43 and column drive circuitry 44 to input video data 45. The entire process is then repeated for the next frame of input video data 45.

Figure 3:
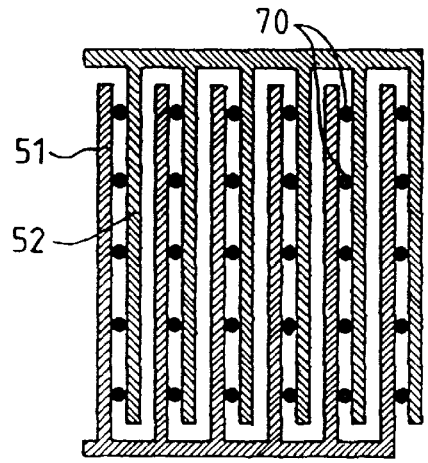
FIG. 3 is a plan view of deflection anodes of the display device.

Anodes 51 and 52 on either side of the exit from the pixel well 70 are individually controllable by the deflection circuitry 53. Referring now to FIG. 3, anodes 51 and 52 are preferably arranged in a comb configuration in the interests of easing fabrication. There are four possible states for anodes 51 and 52, as follows.

1. Anode 51 is OFF; Anode 52 is OFF: there is no accelerating voltage between the cathode 20 and the anodes 51 and 52. This state is not used in normal operation of the display.
2. Anode 51 is ON; Anode 52 is ON: there is accelerating voltage symmetrically about the electron beam. The electron beam path is unchanged. The electrons continue until they strike the Green phosphor.
3. Anode 51 is OFF; Anode 52 is ON: there is an asymmetrical control anode voltage. The electrons are attracted towards the energised anode 52 (which is still providing an accelerating voltage relative to the cathode 20). Electron beam 30 is thus electrostatically deflected towards the Red phosphor.
4. Anode 51 is ON; Anode 52 is OFF: This is the opposite to 3. above. electron beam 30 is deflected towards the Blue phosphor.

Deflection circuitry 53 is arranged to drive anodes 51 and 52 in states 2, 3, and 4 above. In operation, for each column enabled by columns drive circuitry 44, anodes 51 and 52 are energised by the deflection circuitry to scan or "index" electron beam 30 from each pixel well 70 successively across the Red, Green and Blue phosphors of the corresponding set of phosphor stripes 80. Red, Green and Blue video data, is sequentially gated by row drive circuitry 43 onto the row conductors 41 in synchronisation with beam indexing waveforms produced by the deflection circuitry 53. Column drive circuitry 44 thus sequentially selects each successive pixel in a given row. Deflection circuitry 53 thus sequentially selects each sub-pixel of a pixel selected by column drive circuitry 44.

As mentioned earlier, the display has cathode means 20, grid or gate electrodes 40, and an anode 95. The arrangement can thus be regarded as a triode structure. For the purpose of explanation, the region between magnet 60 and cathode 20 will hereinafter be referred to as the triode region 25. Electron flow from cathode 20 is regulated by grid 40 thereby controlling the current flowing to the anode. It should be noted that the brightness of the display does not depend on the velocity of the electrons but on the quantity of electrons striking phosphor 80.

Referring back to FIG. 1, face-plate 90 has a cylindrical section in the row direction. In other words, face-plate 90 has arcuate surfaces in the row direction. This improves viewing angle of the display. Furthermore, a curved face plate can withstand greater mechanical stress than an equivalent flat face plate. The electrostatic field in the anode region 55 between final anode 95 and deflection anodes 50 of the display generates a cylindrical lens 85 above each well 70. The strength of each lens is determined by the corresponding electric field strength (measured in Volts/meter). The electron beam 30 emerging from a well 70 passes through the corresponding lens 85.

As mentioned earlier, beam deflection is achieved by introducing a voltage differential between deflection anodes 51 and 52 on either side of a column of electron beams. The voltage differential effectively rotates the cylindrical lens so that beam 30 is deflected laterally. Deflection sensitivity can be expressed in volts/degree. The deflection angle required for satisfactory beam indexing to the corresponding phosphor strips 80 is determined by the distance between the point of deflection and the final anode. A common mode potential is also applied to deflection anodes 50 to accelerate electrons through magnet 60 from the triode region 25. Changes in the common mode potential produce corresponding changes in the triode bias conditions, thereby affecting display performance.

The cylindrical section of plate 90 causes the distance between final anode 95 to the point of deflection to vary from a minimum at the vertical edges of the screen to maximum at the centre. The variation in distance modifies the strength of the cylindrical lens. The focal point of electron beam 30 moves and the required deflection angle varies inversely with the distance between anode 95 and the point of deflection.

As mentioned earlier, magnet 60 collimates electron beams 30 within wells 70. However, not all magnetic flux lines close through wells 70. There is a residual field extending above and below magnet 60. In the anode region, the residual field further modifies electron motion. Specifically, the residual field continues to have a collimating effect on beam 30, thereby attenuating the effect of lens 85. The beam profile produced by the cylindrical lens is an ellipse with the major axis parallel to the deflection anodes. It will be appreciated then that the profile is not rotationally symmetrical. The residual field continues to urge electrons in beam 30 to follow a helical path towards anode 95, thereby twisting the major axis of the elliptical profile. As mentioned earlier, the red, green and blue phosphors are disposed in stripes parallel to the columns of pixels. If the major axis of the beam profile is skewed relative to the phosphors stripes, a beam landing error is generated. A vertical beam landing error may not produce an objectionable effect. However, a horizontal beam landing may produce a reduction in brightness or, for large errors, a colour purity error.

As indicated earlier, the display device of FIG. 1 is matrix addressed display with an entire column of pixels being driven simultaneously. A displayed image is constructed by sequentially activating columns with simultaneously row data based on an input video signal. Only one column is active at any time. This allows adjustment of the common mode voltage applied to a column without affecting the electron beams produced in adjacent columns.

Figure 4:
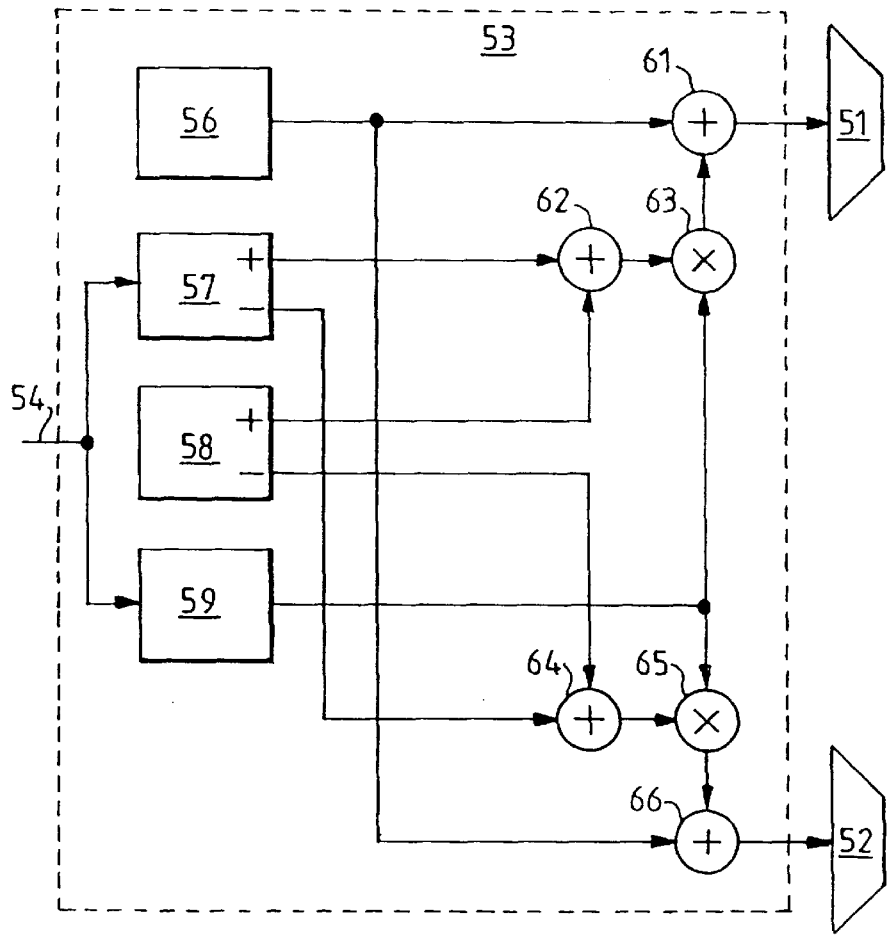
FIG. 4 is a block diagram of deflection circuitry of the display device.

Referring now to FIG. 4, deflection circuitry 53 comprises a first summing block 61 for generating the deflection signal applied to anode 51 and a second summing block 66 for generating the deflection applied to anode 52. The inputs to first summing block 61 are provided by a first voltage generator 56 and a first multiplier 63. The outputs of a third summing block 62 and a parabola generator 59 are connected to the inputs of multiplier 62. The inputs of third summing block 62 are connected to the positive output of a switched signal generator 57, and the positive output of a second voltage generator 58. Switched signal generator 57 and parabola generator 59 are controlled by clock signal 54. The inputs to second summing block 66 are provided by first voltage generator 56 and a second multiplier 65. The outputs of a fourth summing block 64 and parabola generator 59 are connected to the inputs of second multiplier 65. The inputs of fourth summing block 64 are connected to a negative output of switched signal generator 57, and the negative output of second voltage generator 58.

Figure 5A:
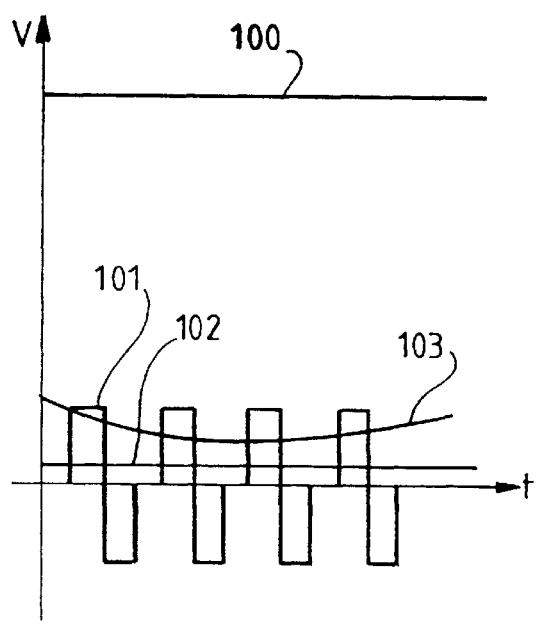
FIGS. 5A and 5B are waveform diagrams of components of deflection signal applied to deflection anodes of the display device.
Figure 5B:
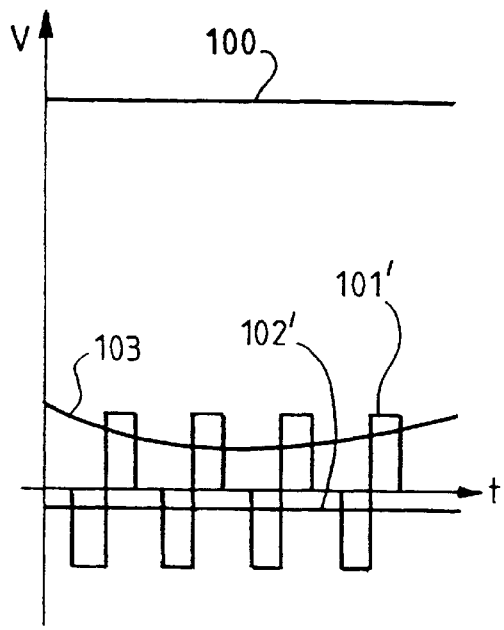

Referring now to FIGS. 5A and 5B, in operation, first signal generator 56 generates a standing DC potential 100. Switched signal generator 57 generates a first switched voltage signal 101 and a second switched voltage signal 101' in anti-phase to the first signal 101. The first and second switched voltage signals are synchronised to the colour sub-pixel data supplied to row conductors 41 by row drive circuitry 43. Second voltage generator 58 generates a standing positive potential 102 and a standing negative potential 102'. Parabola generator 63 generates a parabolic waveform 103 synchronised to the frame refresh rate. Third summing block 62 sums standing potential 102 with switched signal 101. The output of third summing block 62 is then modulated by parabolic waveform 103 via first multiplier 62. The output of multiplier 63 is then added by first summing block 61 to standing potential 100 to produce the deflection signal supplied to deflection anodes 51. Fourth summing block 64 sums standing potential 102' with switched signal 101'. The output of fourth summing block 64 is then modulated by parabolic waveform 103 via second multiplier 65. The output of multiplier 65 is then added by second summing block 66 to standing potential 100 to produce the deflection signal supplied to deflection anodes 52.

Figure 6:
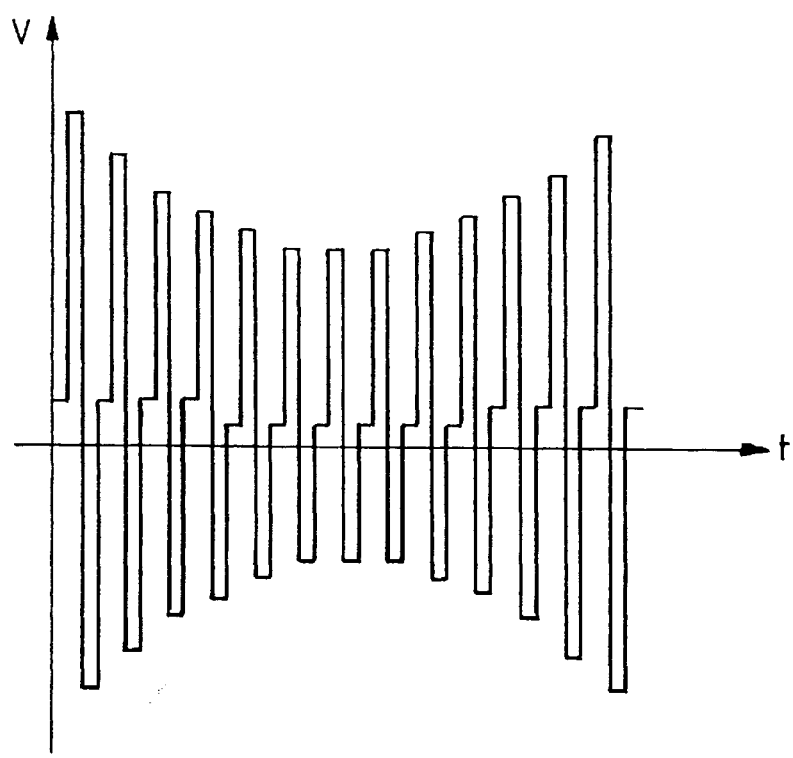
FIG. 6 is a waveform diagram of a differential deflection signal.

Standing potential 100 (typically 100V) accelerates electron beam 30 through magnet 60. Switched signals 101 and 101' facilitate electron deflection. The amplitude of the switched signals 101 and 101' is modulated by parabolic waveform 103 to compensate for curvature of the screen. Potentials 102 and 102' (typically a few volts) produce an offset between the voltage signals applied to deflection anodes 51 and 52 to compensate for beam landing errors. Potentials 102 and 102' are modulated by parabolic waveform 103 to compensate for screen curvature. FIG. 6 shows the composite differential waveform between deflection anodes 51 and 52. It will be appreciated that the offset can be employed to compensate beam landing errors in a magnetic matrix display device having a flat screen, in which case modulation of the offset by parabolic waveform 103 can be dispensed with.

Figure 7:
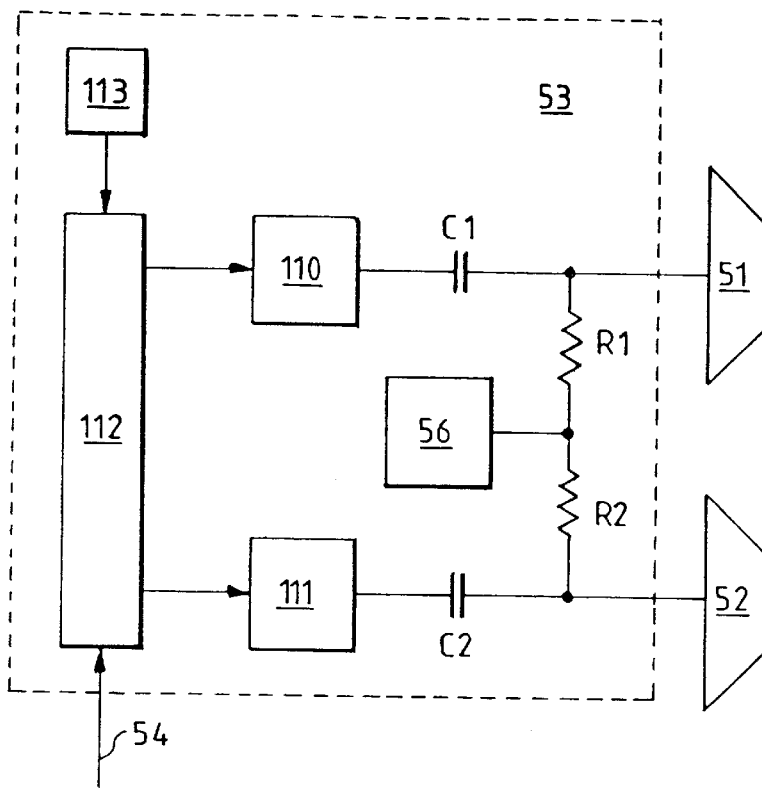
FIG. 7 is another block diagram of deflection circuitry of the display device.

Referring now to FIG. 7, in a preferred embodiment of the present invention, the arrangement of deflection circuitry shown in FIG. 4 is implemented digitally via a microcontroller 112. The pair of digital to analogue convertors (DACs) 110 and 111 are connected to outputs of controller 112. The outputs of DACs 110 and 111 are coupled to deflection anodes 51 and 52 via capacitors C1 and C2 respectively. Deflection anodes 51 and 52 are coupled to voltage generator 56 by resistors R1 and R2 respectively. A non-volatile memory 113 is connected to controller 112. Memory 113 stores in a look up table digital correction values corresponding to samples of the parabola. In operation, controller 112 generates switched voltage signals 101 and 101' in response to clock signal 54. Controller 112 modulates switched voltage signals 101 and 101' according to the digital correction values stored in memory 113 to produce digital deflection signals corrected for optimum beam landing and deflection sensitivity at the inputs to DACs 110 and 111. DACs 110 and 111 convert the corrected digital deflection signals to corrected analogue deflection signals. The corrected analogue deflection signals are superimposed on the standing DC potential generated on anodes 51 and 52 by voltage generator 56. It will be appreciated that, as the display is symmetrical about the midpoint, digital values corresponding to only half of the parabola need be stored in the memory 113. If however, the display has an odd number of columns, one extra memory cell is required.

Figure 8A:
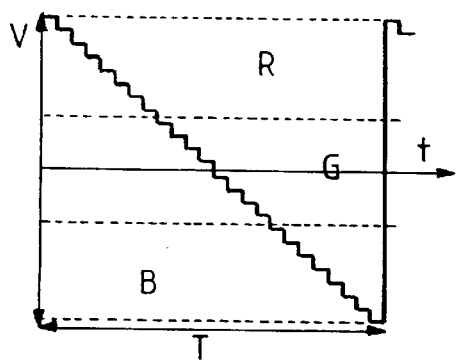
FIG. 8A is a waveform diagram of a differential deflection voltage signal corresponding to a colour sequential autostereoscopic image.
Figure 8B:
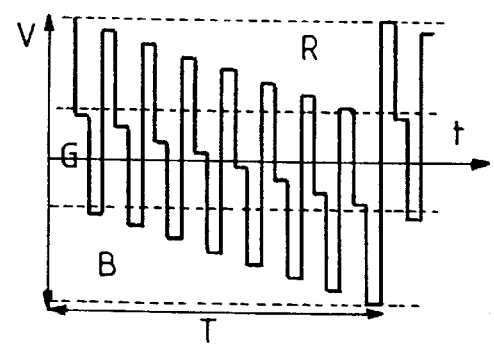
FIG. 8B is a waveform diagram of a differential deflection voltage signal corresponding to a view sequential autostereoscopic image.

A digital embodiment of deflection circuitry 53 of the kind shown in FIG. 7 is especially applicable to auto-stereoscopic displays based on magnetic matrix display technology. By way of example, FIGS. 8A and 8B show differential anode voltage signals corresponding to an 8 view pixel of a colour auto-stereoscopic image. FIG. 8A shows a differential deflection voltage signal for a colour sequential pixel in which 8 views of the red pixel are first generated, followed by 8 views of the green pixel, and finally 8 views of the blue pixel. Thus 24 deflection steps are required. FIG. 8B shows a differential deflection voltage signal for a view sequential pixel in which the red, green and blue sub-pixels are each scanned for each view in turn. It will be appreciated from FIGS. 8A and 8B that colour sequential scanning is associated with significantly lower slew rates on deflection anodes 50.

Figure 10:
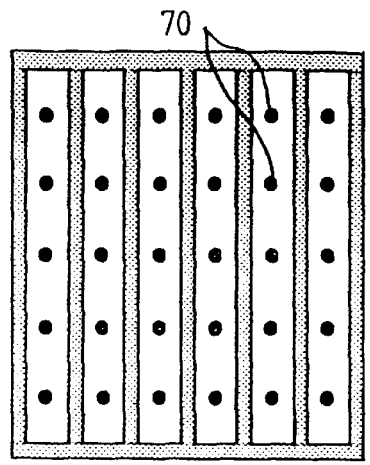
FIG. 10 is a plan view of a focus grid of the display device.
Figure 9:
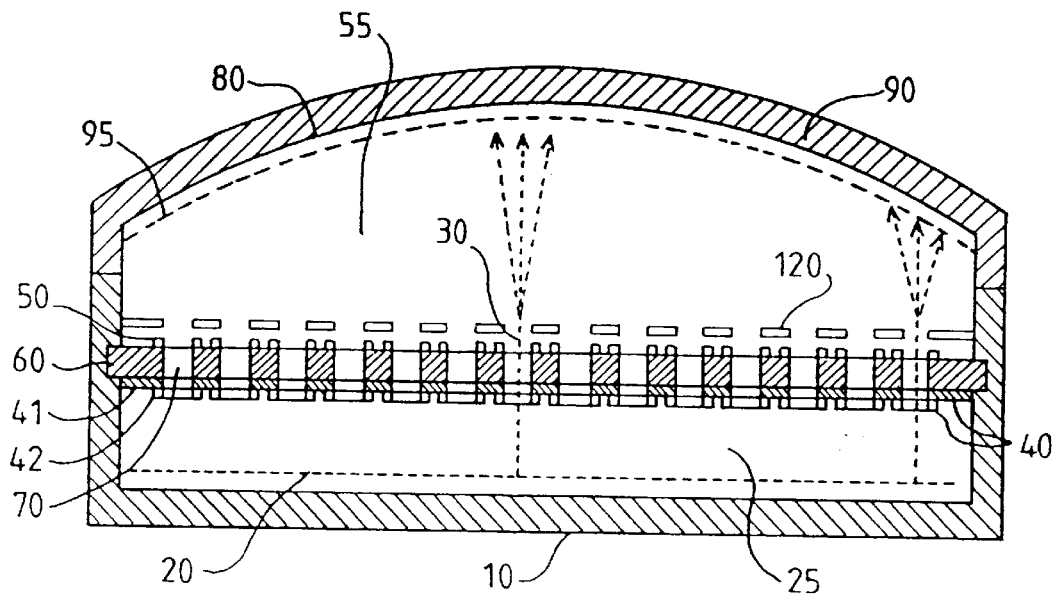
FIG. 9 is a cross-sectional view of another example of a display device embodying the present invention.
Figure 11:
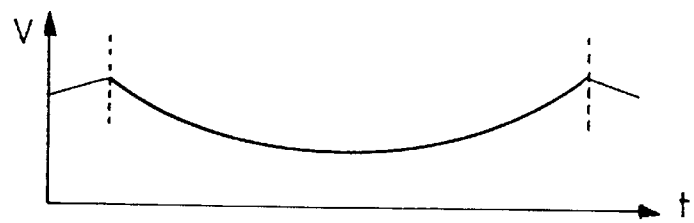
FIG. 11 is a waveform diagram of a dynamic focus control signal.

Referring now to FIG. 9, in a preferred embodiment of the present invention, a focus grid 120 is disposed in the anode region 55 between deflection anodes 50 and anode 95. With reference to FIG. 10, focus grid 120 is a single plane conductor with slots formed therein for passage of electron beams 30. In operation, focus grid 120 permits modification of the electric field strength in front of deflection anodes 50. Focus grid 120 thus permits modification of the focal length of cylindrical lenses 85 introduced by deflection anodes 50. The entirety of focus grid 120 is held at a spatially uniform focus voltage. To maintain constant spot size at anode 95, the focus voltage varies in a shape of a parabola over the frame period, with the minimum focus voltage coinciding with activation of the centre columns of wells 70. The focus voltage is thus varied inversely with distance from the deflection point to final anode 95. The lower focus voltage at the middle of the screen attenuates the cylindrical lens effect of deflection anodes 50 in the middle of the screen. It will be recalled that only one column of wells 70 is active at a time and that the direction of curvature is orthogonal to the active column. The voltage on focus grid 120 thus varies as the active column progresses across the magnet 60. FIG. 11 shows an example of the focus voltage waveform. It will be appreciated that a time varying focus voltage may be capacitively coupled to a standing DC component. A circuit similar to that shown in FIG. 7 may thus be employed for introducing digital dynamic focus control.

As mentioned earlier, the magnetic field in anode region 55 cause beam rotation between cylindrical lenses 85 and phosphors 80 so that the major axis of the elliptical beam profile is skewed relative to the phosphor stripes 80.

In a preferred embodiment of the present invention, a beam stop is disposed in the path of the electron beams 30 to absorb a portion of the total beam. The beam stop comprises an array of apertures each aligned with different pixel well 70. The shape of the apertures determines each electron beam profile. A disadvantage with the beam stop is that display efficiency is reduced by reduction of beam current at anode 95. Furthermore, the effect of the beam stop is reduced with increased distance from anode 95. Still furthermore, the introduction of a beam stop increases manufacturing complexity. The effect of the beam stop is asymmetric if it is placed in the anode region 55 of deflected electron beams 30.

Figure 12:
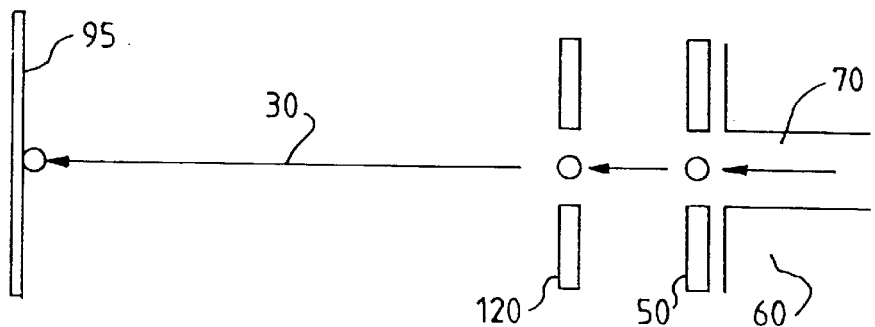
FIG. 12 is a simplified side view of an electron passing through an anode region of the display device.

Referring now to FIG. 12, in a particularly preferred embodiment of the present invention, the problems associated with employing a beam stop to control electron beam profile are alleviated by instead controlling the electron beam profile via focus grid 120. Specifically, the time of flight of an electron between deflection anodes 50 and final anode 95 may be varied by varying the focus voltage. Thus, rotation of the electron beams 30 may be varied by varying the focus voltage.

For example, suppose the focus voltage is set such that it does not disturb the electrostatic field in anode region 55. The time of flight of an electron may be approximately calculated from the kinetic energy of the electron assuming a linear electrostatic field in anode region 55. The kinetic energy of the electron, $E=\frac{1}{2} \cdot mv^2$, where m is the mass of the electron and v is the velocity of the electron. With a distance of 5 mm between deflection anodes 50 and final anode 95; a distance of 1 mm between deflection anodes 50 and focus grid 120 a voltage of 10 kV on final anode 95; a voltage of 2.4 kV on focus grid 120; and an average voltage between deflection anodes 50 and final anode 95 of 4.95 kV, the time of flight of the electron is 119.9 picoseconds.

Suppose now that the voltage on focus grid 120 is dropped to 1 kV to form a convergent beam at final anode 95. The average voltage between focus grid 120 and deflection anode 50 is 450V and the average voltage between focus grid 120 and final anode 95 is 4500V. The time of flight of the electron between deflection anodes 50 and focus grid 120 is 79.53 picoseconds and the time of flight of the electron between focus grid 120 and final anode 95 is 100.60 picoseconds. The total time of flight of the electron is therefore increased by 60.23 picoseconds to 180.13 picoseconds. The extra time of flight allows further beam rotation by the magnetic field in the anode region 55.

The values included in the above calculations are provided for simplicity of explanation only. The values assume that the electrostatic and magnetic fields are uniform. In practise, the values will partially depend on dimensions and spacings of components of the display. For display having screens of cylindrical section, a cylindrical section focus grid is preferred in view of the aforementioned relationship between focal length and beam rotation. One advantage with this technique is that none of the electron beam energy is lost prior to collision with final anode 95.

What is claimed is:

1. A display device comprising: a cathode; a permanent magnet; a two dimensional array of rows and columns of channels extending between opposite poles of the magnet for receiving electrons from the cathode; a screen having a plurality of phosphor pixels each corresponding to a different channel and each comprising a plurality of sub-pixels facing the side of the magnet remote from the cathode; grid electrode means disposed between the cathode means and the magnet; a plurality of pairs of anodes disposed between the magnet and the screen and extending parallel to the columns of channels, each pair corresponding to a different column of channels, and each pair having first and second anodes extending along opposite sides of the corresponding column of channels; address means for supplying control signals to the grid electrode means to selectively control flow of electrons from the cathode through each channel to the corresponding pixel; and an anode drive circuit for supplying anode drive signals to the first and second anodes respectively; the anode drive circuit comprising bias means for generating an acceleration component of each anode drive signal for accelerating electrons through the channels, deflection means for generating a deflection component of each anode drive signal for deflecting electrons emerging from each channel towards different sub-pixels of the corresponding pixel, and correction means for varying the deflection component to align the deflected electron beams with the corresponding sub-pixels.

2. A display device as claimed in claim 1, wherein the correction means comprises an offset generator for generating an offset between the deflection component of the anode drive signal supplied to the first anode and the deflection component of the anode drive signal supplied to the second anode.

3. A display device as claimed in claim 2, wherein the screen has a cylindrical section in a direction orthogonal to the columns of channels and the offset generated by the offset generator has a parabolic waveform.

4. A display device as claimed in claim 3, wherein the correction means comprises a modulator for amplitude modulating the deflection components generated by the deflection means with a parabolic waveform.

5. A display device comprising: a cathode; a permanent magnet; a two dimensional array of rows and columns of channels extending between opposite poles of the magnet for receiving electrons from the cathode;

a screen having a plurality of phosphor pixels each corresponding to a different channel and each facing the side of the magnet remote from the cathode;

grid electrode means disposed between the cathode means and the magnet;

anode means disposed between the screen and the magnet;

a focus electrode means disposed between the screen and the anode means;

address means for supplying control signals to the grid electrode means to selectively control flow of electrons from the cathode through each channel to the corresponding pixel;

an anode drive circuit for supplying anode drive signals to the anode means for accelerating electrons through the channels; and, a focus drive circuit for supplying a focus drive signal to the focus electrode means to focus the electrons emerging from the channels onto the screen.

6. A display device as claimed in claim 5, wherein the screen has a cylindrical section in a direction orthogonal to the columns of channels and the focus drive signal supplied to the focus electrode means comprises a parabolic waveform.

7. A display device as claimed in claim 5, comprising beam rotation means for varying the focus drive signal supplied to the focus electrode means to rotate beams of electrons travelling from the cathode means to the screen.

8. A display device as claimed in claim 5 wherein each pixel comprises a plurality of sub-pixels; wherein the anode means comprises a plurality of pairs of anodes disposed between the magnet and the screen and extending parallel to the columns of channels, each pair corresponding to a different column of channels, and each pair having first and second anodes extending along opposite sides of the corresponding column of channels; and wherein the anode drive means comprises deflection means for supplying deflection signals to the first and second anodes to sequentially deflect electrons emerging from each channel towards different sub-pixels of the corresponding pixel.

9. A display device as claimed in claim 8, wherein the focus electrode means comprises a plane electrical conductor having slots formed therein, each slot being aligned with a different column of channels.

10. A display device as claimed in claim 1, wherein the grid electrode means comprises a plurality of parallel row conductors and a plurality of parallel column conductors arranged orthogonally to the row conductors, each channel being located at a different intersection of a row conductor and a column conductor.

* * * * *